United States Patent
Ting

(10) Patent No.: US 11,403,302 B1
(45) Date of Patent: Aug. 2, 2022

(54) QUANTILE DATA SKETCHES BASED ON FREQUENT DATA ITEMS

(71) Applicant: Tableau Software, LLC, Seattle, WA (US)

(72) Inventor: Daniel Ting, Edmonds, WA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 175 days.

(21) Appl. No.: 16/942,676

(22) Filed: Jul. 29, 2020

(51) Int. Cl.
*G06F 16/2457* (2019.01)
*G06F 16/23* (2019.01)
*G06F 16/2455* (2019.01)

(52) U.S. Cl.
CPC .... *G06F 16/24578* (2019.01); *G06F 16/2379* (2019.01); *G06F 16/24568* (2019.01)

(58) Field of Classification Search
CPC ............... G06F 2212/401; G06F 16/1744
See application file for complete search history.

(56) References Cited

U.S. PATENT DOCUMENTS

| | | | | |
|---|---|---|---|---|
| 11,216,186 | B1* | 1/2022 | Armangau | G06F 3/0608 |
| 2008/0005522 | A1* | 1/2008 | Paladini | G06F 12/08 |
| | | | | 711/170 |
| 2015/0363456 | A1* | 12/2015 | Raman | G06F 16/282 |
| | | | | 707/693 |
| 2020/0151268 | A1* | 5/2020 | Johnson | G06F 16/2282 |
| 2022/0038113 | A1* | 2/2022 | Dupont | H03M 7/6011 |

* cited by examiner

*Primary Examiner* — Robert W Beausoliel, Jr.
*Assistant Examiner* — Pedro J Santos
(74) *Attorney, Agent, or Firm* — Morgan, Lewis & Bockius LLP

(57) ABSTRACT

Data items are aggregated in a quantile sketch according to a compactor hierarchy. A first number of data items are stored in a first buffer corresponding to a first (i.e., lowest) compaction level of the compactor hierarchy, and a top level number of data items are stored in a top buffer corresponding to a top compaction level of the compactor hierarchy. For a first subset of the first number of data items, each data item is already stored in the top buffer, and a weight of the respective data item stored in the top buffer is increased by 1. For a second subset of the first number of data items, each data item does not match any data item stored in the top buffer, and a second number of data items are selected from the second subset and stored in a second buffer of a second compaction level.

20 Claims, 12 Drawing Sheets

QUANTILE DATA SKETCHES BASED ON FREQUENT DATA ITEMS

TECHNICAL FIELD

The disclosed embodiments relate generally to data sketches for summarizing data and more specifically to systems and methods that implement quantile data sketches involving frequent data items.

BACKGROUND

When analyzing massive data, even simple operations such as computing a sum or a mean are costly and time consuming. These simple operations are frequently performed by people investigating the data interactively, asking a series of questions about the data. In addition, automated systems must monitor or collect a multitude of statistics. Data sketching algorithms enable the information in these massive data to be efficiently processed, stored, and queried. This allows them to be applied, for example, in real-time systems, both for ingesting massive data streams or for interactive analysis.

In order to achieve this efficiently, sketches are designed to answer a specific class of questions, and there is typically an error in the answer. In other words, a data sketch is a form of lossy compression on original data. A person must choose what information to lose from the original data. A good sketch makes efficient use of the data so that errors are minimized while having the flexibility to answer a broad range of questions of interest. Some sketches, such as HyperLogLog, are constrained to answer very specific questions with extremely little memory. On the other end of the spectrum, sampling-based methods, such as coordinated sampling, are able to answer many questions about the original data, but at the cost of far more space to achieve the same approximation error.

Computing quantiles is a basic, but important, problem in data analysis. It is used, for example, to set cutoffs for anomaly detection, to compute quality of service (QoS) metrics (e.g., a $99^{th}$ percentile latency), and to generate histograms with appropriate bin widths. However, naive computation of quantiles requires maintaining and sorting all of the data. A long line of work in quantile sketching culminating in a KLL sketch, which allows all approximate quantiles to be computed with ε accuracy and δ failure probability in space $O(\varepsilon^{-1} \log \log(\delta^{-1}\varepsilon^{-1}))$. While this matches the space-complexity lower bound for arbitrary streams, there are important cases where this is clearly suboptimal. Specifically, the data sketch can be suboptimal for three types of common streams and queries: streams containing frequent items, independent and identically distributed (i.i.d.) streams, and queries for quantiles in the tail. An alternative solution is needed to produce accurate quantile-based data sketching results efficiently for these common streams and queries.

SUMMARY

This disclosure provides a new data sketch for processing massive data sets and addresses a common problem of identifying frequent items or heavy hitters in the data sets. This data sketch is optimal or nearly optimal for arbitrary streams of data sets (e.g., i.i.d. streams and streams with finite universes). The resulting sketch also serves a dual purpose as a frequent item sketch for i.i.d. streams. It is guaranteed to accurately estimate the proportion of any frequent data item while obtaining tighter error guarantees for a rank of non-frequent data items.

In accordance with some embodiments, a method computes data sketches for data sets. Typically, the data sets are very large, so data sketches are created in order to quickly answer certain questions about the data set. In some instances, the data set is streaming, and the process runs in real time as data rows are received. In some instances of receiving streaming data, the data is buffered. The method is performed at a computer system having one or more processors and memory. The memory stores one or more programs configured for execution by the one or more processors.

The computer system obtains, from a data source, a plurality of data items corresponding to a plurality of data rows having a plurality of data fields, and determines a number N of compaction levels in a compactor hierarchy for aggregating the data items obtained from the data source. N buffers are allocated in the memory for N compaction levels. Each buffer has a respective storage space for storing a respective subset of the plurality of data items and storing a set of data weights. Each data item stored in the respective buffer is associated with a respective data weight. A first number $k_1$ of data items of the plurality of data items is stored in a first buffer corresponding to a first compaction level of the N compaction levels. The computer system identifies a top level number $k_T$ of data items stored in an Nth buffer corresponding to an Nth compaction level (also called a top compaction level) of the N compaction levels.

For each data item of the first number $k_1$ of data items stored in the first buffer, the computer system determines whether the respective data item matches one of the top level number $k_T$ of data items stored in the Nth buffer. For a first subset of the data items stored in the first buffer, the computer system determines that each data item in the first subset matches a respective data item stored in the Nth buffer, and increases a corresponding data weight of the respective data item stored in the Nth buffer by 1. For a second subset of the data items (i.e., frequent data items) stored in the first buffer, the computer system determines that each data item in the second subset does not match any data item stored in the Nth buffer, and selects a second number $k_2$ of data items in the second subset of data items stored in the first buffer and storing the second number $k_2$ of data items in a second buffer corresponding to a second compaction level in the compactor hierarchy. The first number $k_1$ is scaled to the second number $k_2$ by a compaction factor F. For example, F is equal to 2, and $k_2$ is equal to $k_1/2$.

In some embodiments, for each of the i-th compaction level (1<i<N), the computer system selects an (i+1)-th number $k_{i+1}$ of data items from an i-th number $k_i$ of data items stored in the i-th buffer corresponding to the i-th compaction level, and stores the (i+1)-th number $k_{i+1}$ of data items in the (i+1)-th buffer corresponding to the (i+1)-th compaction level in the compactor hierarchy. Optionally, the i-th number $k_i$ is scaled to the (i+1)-th number by the compaction factor F when i is less than N−1.

In some embodiments, all data items stored in the N buffers are ranked based on their respective data weights. Upon receiving a user query for a data item that is located at a specific rank, the computer system identifies the data item that is located at the specific rank in the N buffers based on the respective data weights of the data items stored in the N buffers. Alternatively, in some embodiments, the top level number $k_T$ of data items stored in the Nth buffer are ranked based on their respective weights. Upon receiving a user query for a data item that is located at a specific rank, the computer system identifies the data item that is located at the specific rank in the Nth buffer based on the respective weights of the top level number $k_T$ of data items in the Nth buffer. The specific rank optionally includes a percentage value.

In some embodiments, a computer system includes one or more processors and memory. The memory stores one or more programs. The programs are configured for execution by the one or more processors. The one or more programs include instructions for performing any of the methods described herein.

In some embodiments, a non-transitory computer readable storage medium stores one or more programs configured for execution by a computer system having one or more processors and memory. The one or more programs include instructions for performing any of the methods described herein.

Thus methods, systems, devices, and graphical user interfaces are disclosed for building quantile data sketches that enable a user to quickly get answers about a large data set.

BRIEF DESCRIPTION OF THE DRAWINGS

For a better understanding of the aforementioned systems and methods, as well as additional systems methods for implementing data sketches, reference should be made to the Description of Embodiments below, in conjunction with the following drawings in which like reference numerals refer to corresponding parts throughout the figures.

Figure 1:
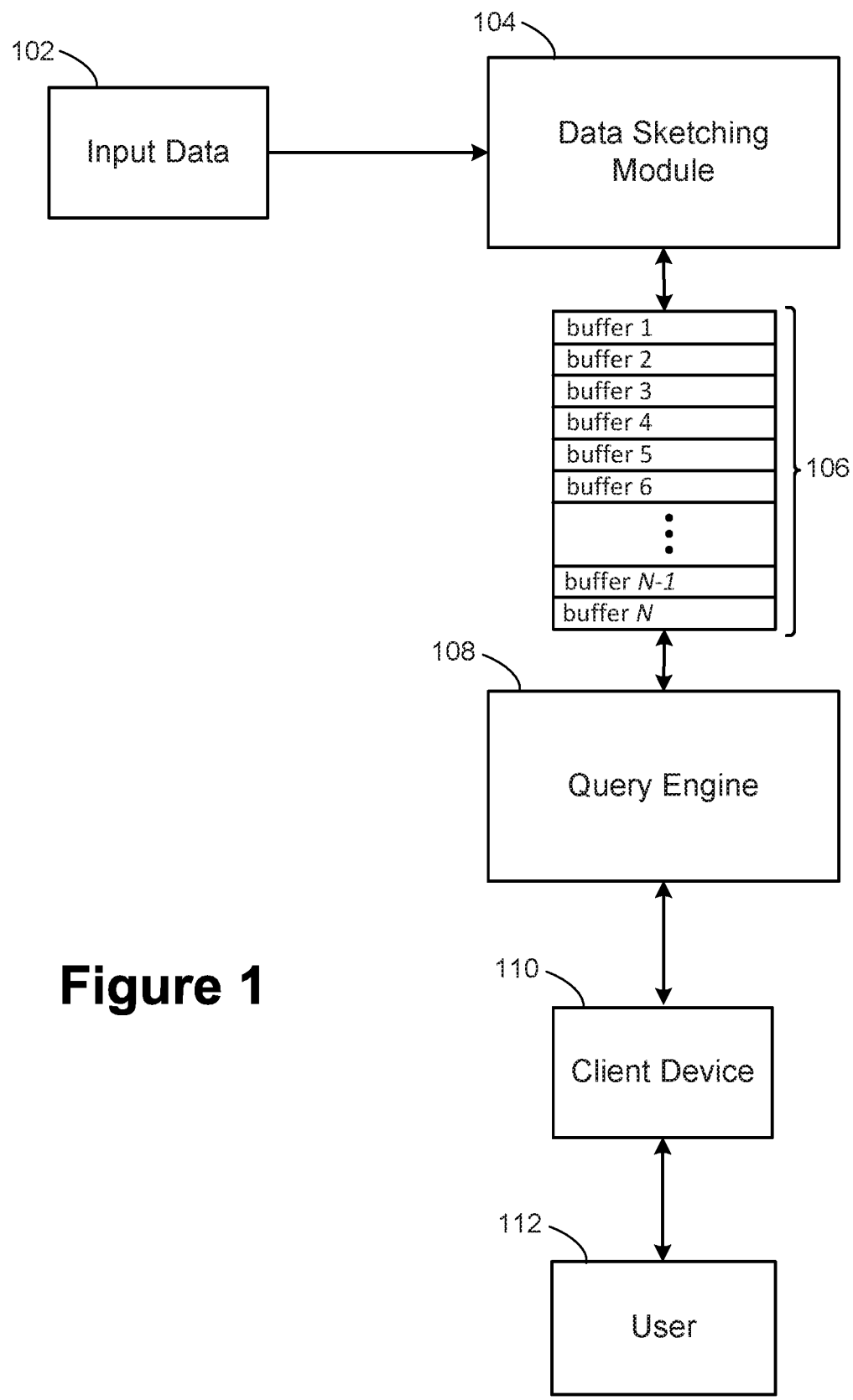
FIG. 1 illustrates schematically a general context in which a data sketch is constructed and used, in accordance with some embodiments.

Reference will now be made to embodiments, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF EMBODIMENTS

Quantile sketches can be described as rank estimation sketches or cumulative distribution function (CDF) sketches. The rank of a specific data item in a data set is defined as the number of data items in the data set that are less than or equal to the specific data item. A quantile sketch with an error s at the specific data item returns an estimate of the rank less than the error $\varepsilon$. A quantile sketch with a probabilistic ($\varepsilon$, $\delta$) guarantee allows a failure probability of $\delta$. A pointwise quantile problem queries a single point and requires a pointwise error bound. An all quantiles problem requires the error $\varepsilon$ to be uniformly bounded.

A compactor hierarchy consists of a set of buffers at a plurality of compaction levels. New items are first added to a buffer corresponding to a bottom compaction level. This buffer is equipped with a compaction operation that approximates distribution of data items in the buffer with a smaller set when the buffer is full. In some embodiments, the compactor hierarchy is based on an alternating compactor, and the compaction operation sorts each buffer and selects every other data item to fill an immediately higher compaction level. The selected data items in a buffer of each intermediate compaction level are added to a buffer of its immediately higher compaction level, while remaining data items in the intermediate compaction level are discarded. This compaction operation optionally includes randomly selecting either the odd indices or the even indices. Each item in the buffer of the immediately higher compaction level represents two items in the buffer of the corresponding intermediate compaction level, and therefore, weights of the selected items are doubled in the buffer of the immediately higher compaction level compared with their weights in the intermediate compaction level. The size of the buffer of each intermediate compaction level is the maximum number of data items that are explicitly stored in the buffer along with their weights. The estimated rank R of a data item x is given as:

$$R(x) = \Sigma_l \Sigma_{y \in B_l} 2^l 1(y \leq x) \qquad (1)$$

where l is a compaction level, and $B_l$ is a data set stored at the compaction level. As such, the compaction operation in a buffer of a specific compaction level is seen as taking a systematic sample with a corresponding granularity over weighted data items in all buffers in this compactor hierarchy.

In various embodiments of this application, a bottom compaction level of a compactor hierarchy includes two types of data items, frequent data items and aggregated data items. Each frequent data item has been aggregated and stored in a top compaction level of the compactor hierarchy, and a corresponding weight of the respective frequent data item in the top compaction level is increased according to a number of occurrences of the respective frequent data item in the bottom compaction level. In contrast, the aggregated data items in the bottom compaction level have not been stored in the top compaction level, and are aggregated according to a compaction factor F (e.g., equal to 2) gradually from the bottom compaction level to the top compaction level. As such, the frequent data items in a data set are directly aggregated to the top compaction level without incurring the risk of being discarded in any intermediate compaction operation, which allows these frequent data items to be accurately and closely counted with a limited error sin this quantile data sketch.

FIG. 1 illustrates schematically a general context 100 in which a data sketch is constructed and used, in accordance with some embodiments. A data sketching module 104 receives input data 102, which may be a data stream or retrieved from a stored data source (e.g., sources 240 and 290 in FIGS. 2A and 2B). In some embodiments, data from the input data 102 is placed into a data buffer as rows of data are received or retrieved. The data sketching module 104 manages a compactor hierarchy including a number N of compaction levels, where N is a positive integer larger than 1. The number N of compaction levels is determined at the outset before processing rows from the input data 102, and the number N of compaction levels remains fixed during the processing. In general, the number N of compaction levels is significantly less than the number of rows in the input data. For example, 10 million rows of data and 8 compaction levels. Further, N buffers 106 are allocated for the N compaction levels. Each of the N compaction levels corresponds to a respective one of the N buffers 106. Each buffer 106 has a respective storage space for storing a respective subset of the input data 102 and a set of data weights. Each data item stored in the respective buffer 106 is associated with a respective data weight.

Using the data in the buffers 106, a query engine 108 is able to answer specific types of questions about the input data 102. In some instances, queries against the buffers 106 are not processed until all of the data is processed (e.g., the input stream 102 is closed). In other instances, queries are allowed against the buffers 106 while the data sketching module 104 is still processing rows from the input data 102. The specific types of questions supported by the data sketch include, but are not limited to, estimating a rank in the input data 102 and identifying frequent items.

The query engine 108 receives a query from a client device 110, which may be entered by a user 112. In some instances, a query is generated at the client device 110 by an automated process (e.g., generated by a data analysis application 222 according to user specification of data visualization characteristics).

Figure 2A:
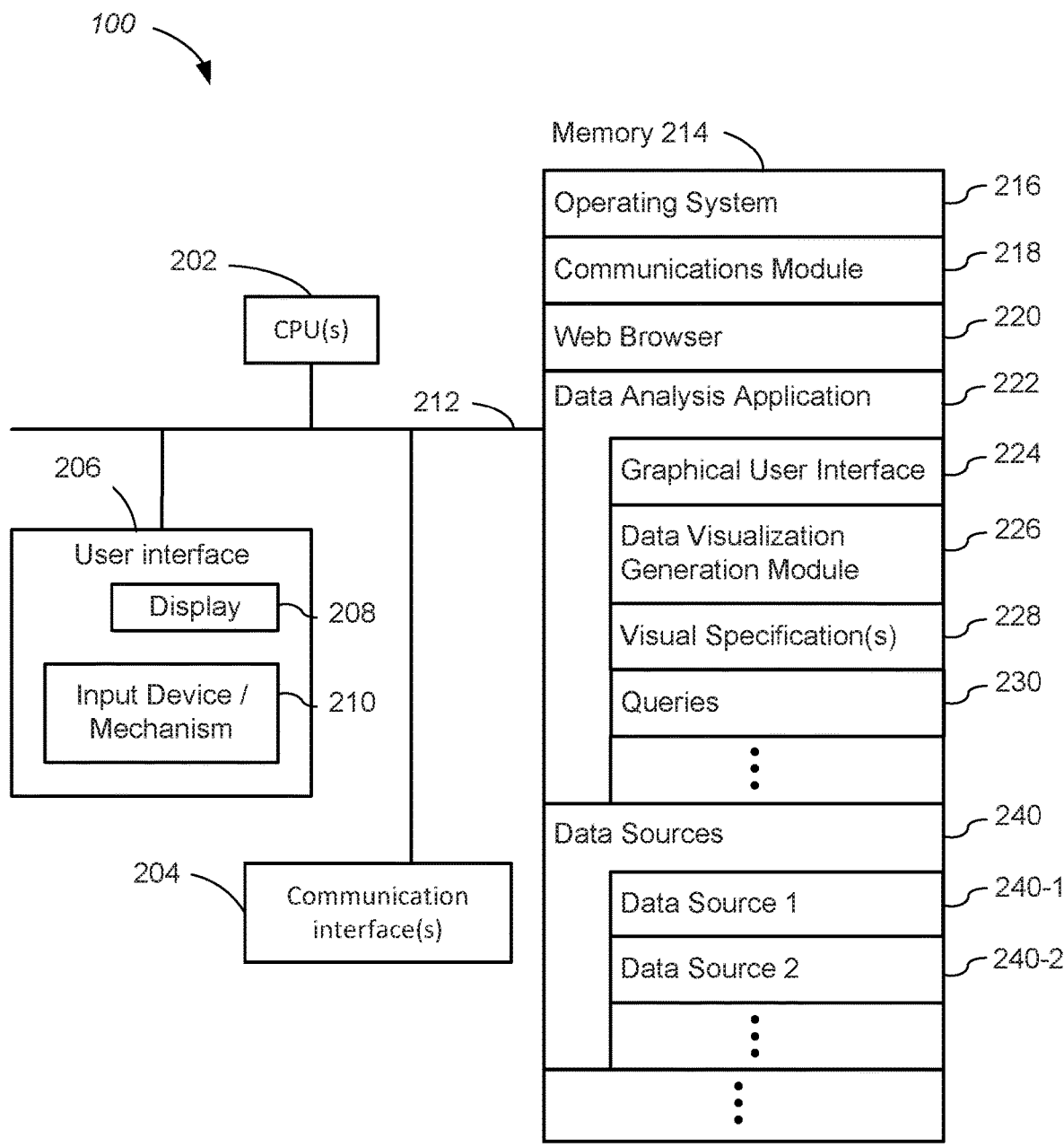
FIG. 2A is a block diagram illustrating a client device, in accordance with some implementations.

FIG. 2A is a block diagram illustrating a client device 110, in accordance with some implementations. A client device 110 may also be referred to as a computing device or a personal device. Various examples of a client device 110 include a desktop computer, a laptop computer, a tablet computer, a smart phone, and other computing devices that have a processor capable of running user applications (e.g., a data analysis application 222). The client device 110 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The client device 110 includes a user interface 206 comprising a display device 208 and one or more input devices or mechanisms 210. In some implementations, the input devices or mechanisms 210 include a keyboard. In some implementations, the input device/mechanism includes a "soft" keyboard, which is displayed as needed on the display device 208, enabling a user to "press keys" that appear on the display 208. In some implementations, the display 208 and input device or mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPUs 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the client device 110 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data analysis application 222, which provides a graphical user interface 224 for a user to construct visual graphics;
- one or more data sources 240 (e.g., a first data source 240-1 and a second data source 240-2), which are used by the data analysis application 222 and are optionally stored as spreadsheet files, CSV files, XML files, or flat files, or in a relational database.

In an example, a user selects one or more data sources 240 (which may be stored on the client device 110 or stored remotely), selects data fields from the data source(s), and uses the selected fields to define a visual graphic. In some implementations, the information the user provides is stored as a visual specification 228. The data analysis application 222 includes a data visualization generation module 226, which takes the user input (e.g., the visual specification 228), and generates a corresponding visual graphic (also referred to as a "data visualization" or a "data viz"). The data analysis application 222 then displays the generated visual graphic in the user interface 224. In some implementations, the data analysis application 222 executes as a standalone application (e.g., a desktop application). In some implementations, the data analysis application 222 executes within the web browser 220 or another application using web pages provided by a web server. In some implementations, the data analysis application 222 sends one or more queries 230 to an external computer system 250 to retrieve data. In some instances, data is retrieved from one or more data sources 290 (e.g., a first data source 290-1 and a second data source 290-2) by a database engine 280 running on the computer system 250. In some instances, data is retrieved from buffers 106 of the computer system 250 that were populated by a data sketch according to a compaction hierarchy.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
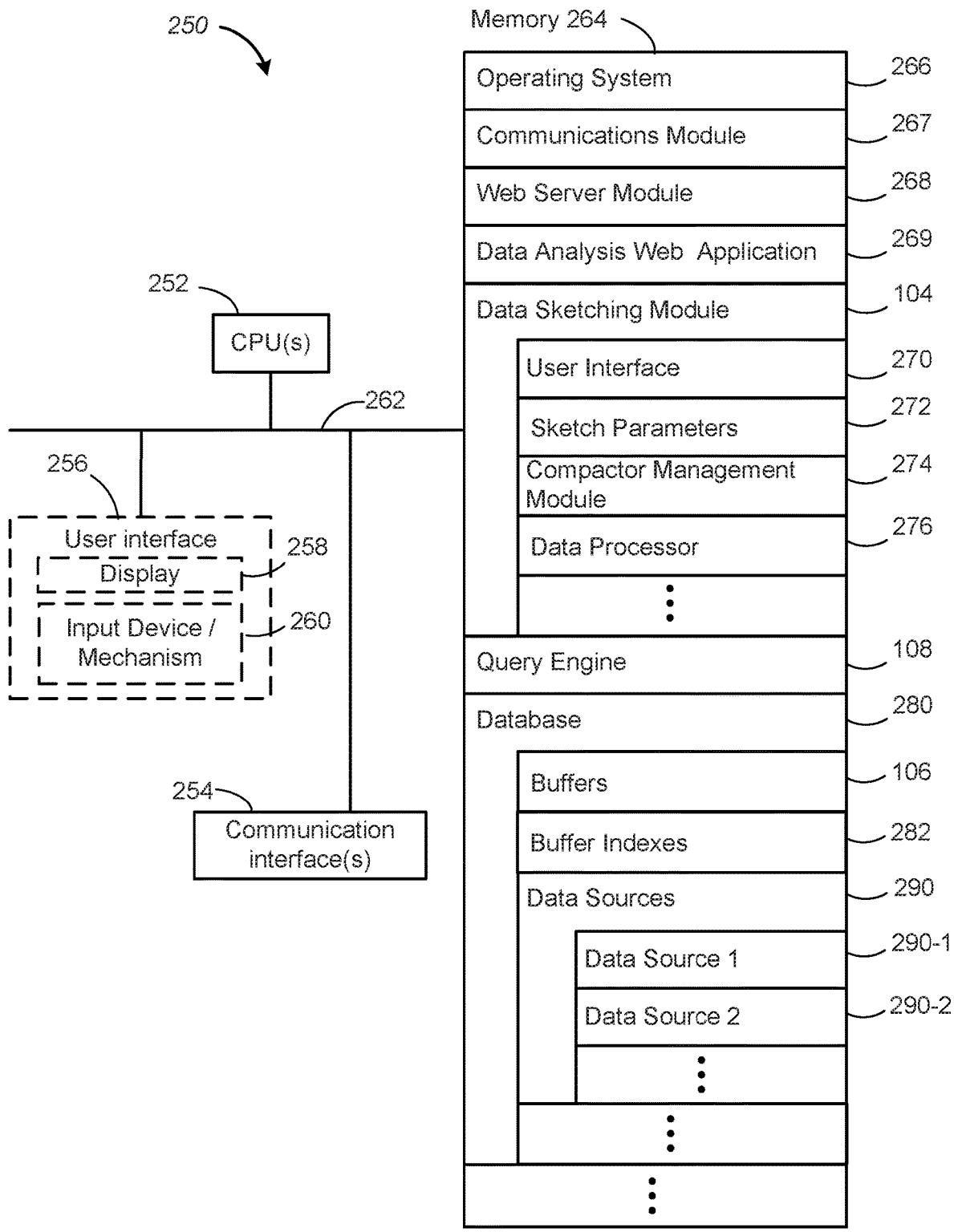
FIG. 2B is a block diagram of a computer system, in accordance with some embodiments.

FIG. 2B is a block diagram of a computer system 250, in accordance with some embodiments. A computer system 250 includes one or more individual computers. The computer system 250 may host one or more databases 280 and/or may provide various executable applications or modules. A computer system 250 typically includes one or more processing units/cores (CPUs) 252, one or more network interfaces 254, memory 264, and one or more communication buses 262 for interconnecting these components. In some implementations, the computer system 250 includes a user interface 256, which includes a display device 258 and one or more input devices 260, such as a keyboard and a mouse. In some implementations, the communication buses 262 includes circuitry (sometimes called a chipset) that interconnects and controls communications between system components.

In some implementations, the memory 264 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 264 includes one or more storage devices remotely located from the CPUs 252. The memory 264, or alternatively the non-volatile memory device(s) within the memory 264, comprises a non-transitory computer readable storage medium.

In some implementations, the memory 264 or the computer readable storage medium of the memory 264 stores the following programs, modules, and data structures, or a subset thereof:

- an operating system 266, which includes procedures for handling various basic system services and for performing hardware dependent tasks;
- a network communication module 267, which is used for connecting the computer system 250 to other computers via the one or more communication network interfaces 254 (wired or wireless) and one or more communication networks, such as the Internet, other wide area networks, local area networks, metropolitan area networks, and so on;
- a web server (such as an HTTP server) module 268, which receives web requests from users and responds by providing responsive web pages or other resources;
- a data analysis web application 269, which implements server-side functions of the data analysis application 222 of a user's client device 110;
- a data sketching module 104, which receives rows of data from input data 102 (e.g., a streaming source or one or more stored data sources 290) and builds a data sketch;
- a query engine 108, which receives queries that are limited to specific types of questions based on the stored data sketch (e.g., ranks and frequent items according to the data fields selected for the sketch), and generates responsive query results from data items stored in the buffers 106, where in an example, to respond to a quantile query 230 including a specific data item, the query engine 108 identifies a rank of the specific data items among the data sketch based on the data items and weights stored in the buffers 106 in association with the data sketch; and
- one or more databases 280, which store data that may be used by the data analysis application 222, data analysis web application 269, and/or query engine 108 to answer specific queries using data in the buffers 106 of a data sketch.

In general, the data analysis web application 269 has the same functionality as a desktop data analysis application 222, but provides the flexibility of access from any device at any location with network connectivity, and does not require installation and maintenance. In some implementations, the data analysis web application 269 includes various software modules to perform certain tasks, including one or more of a user interface module, a data retrieval module, a data visualization generation module 226, a relationship identification module, and a relationship builder module. In some implementations, the data analysis web application 269 uses a visual specification 228, as described above with respect to FIG. 2A.

In some implementations, the data sketching module 104 includes a user interface 270, which enables users to specify sketch parameters 272 for a data sketch (e.g., the data source, which fields will be used to determine how to fill the buffers 160 of different compaction levels, and which field will be used to compute a data weight and a rank of a data item in the entire data set). Examples of the sketch parameters 272 include, but are not limited to, the number N of compaction levels, sizes of each buffer 106, and compaction factor F between two immediately adjacent compaction levels. In other implementations, a compactor management module 274 determines the number N of compaction levels and sizes of each buffer 106 based on known data about the data source and/or other user-specified sketch parameters (e.g., the maximum allowable error for the data sketch). The data sketching module 104 includes a data processor 276, which processes individual rows of data from the input data 102 to update the data in the buffers 106 corresponding to different compaction levels of the compactor hierarchy.

Note that a single database may store buffers 106 for a plurality of distinct data sketches. When there are multiple data sketches, they may be based on the same input data 102, or based on distinct input data sets 102. Typically, there are one or more buffer indexes 282 for the buffers 106. For example, for efficiency of matching a new row to existing buffers, there is a first buffer index 282 based on the selected key fields. In this way, finding the matching buffer (if there is one) is performed by a quick lookup.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 264 stores a subset of the modules and data structures identified above. Furthermore, the memory 264 may store additional modules or data structures not described above.

Although FIG. 2B shows a computer system 250, FIG. 2B is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a computer system 250 may be stored on a client device 110. In some implementations, the functionality and/or data may be allocated between a client device 110 and a computer system 250. FIG. 2B need not represent a single physical device. In some implementations, the functionality of the computer system 250 is allocated across multiple physical devices. As used herein, references to a "computer system" include various groups, collections, or arrays of individual computing devices, which collectively provide the described functionality, and the physical servers need not be physically collocated (e.g., the individual physical devices could be spread throughout the United States or throughout the world).

Figure 3A:
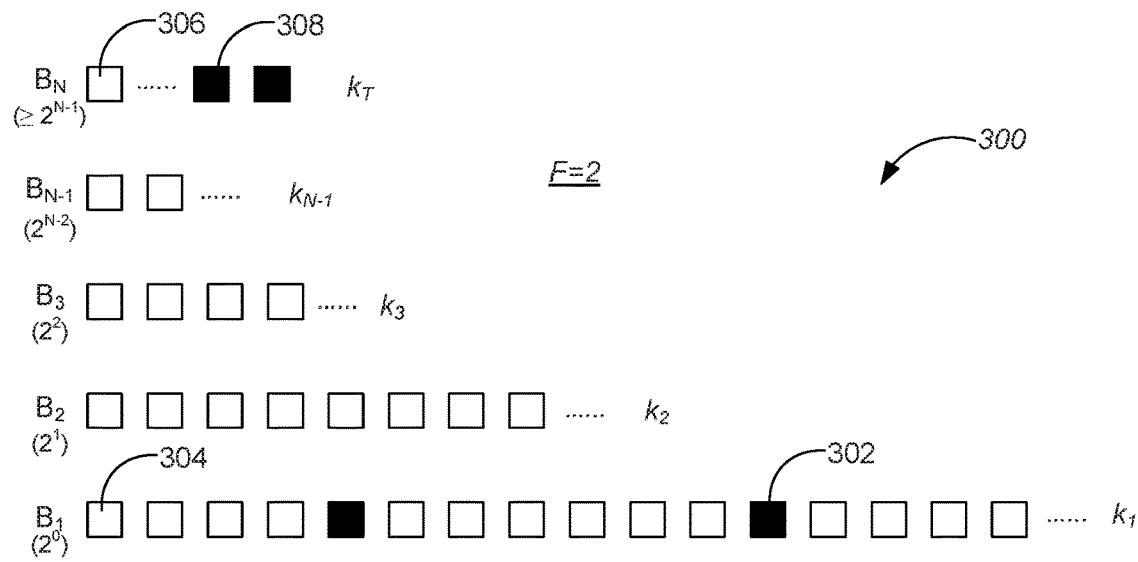
FIG. 3A illustrates a compactor hierarchy that is applied to build a data sketch, in accordance with some embodiments, and FIG. 3B are three example top compaction levels $B_N$ in the compactor hierarchy, in accordance with some embodiments.
Figure 3B:
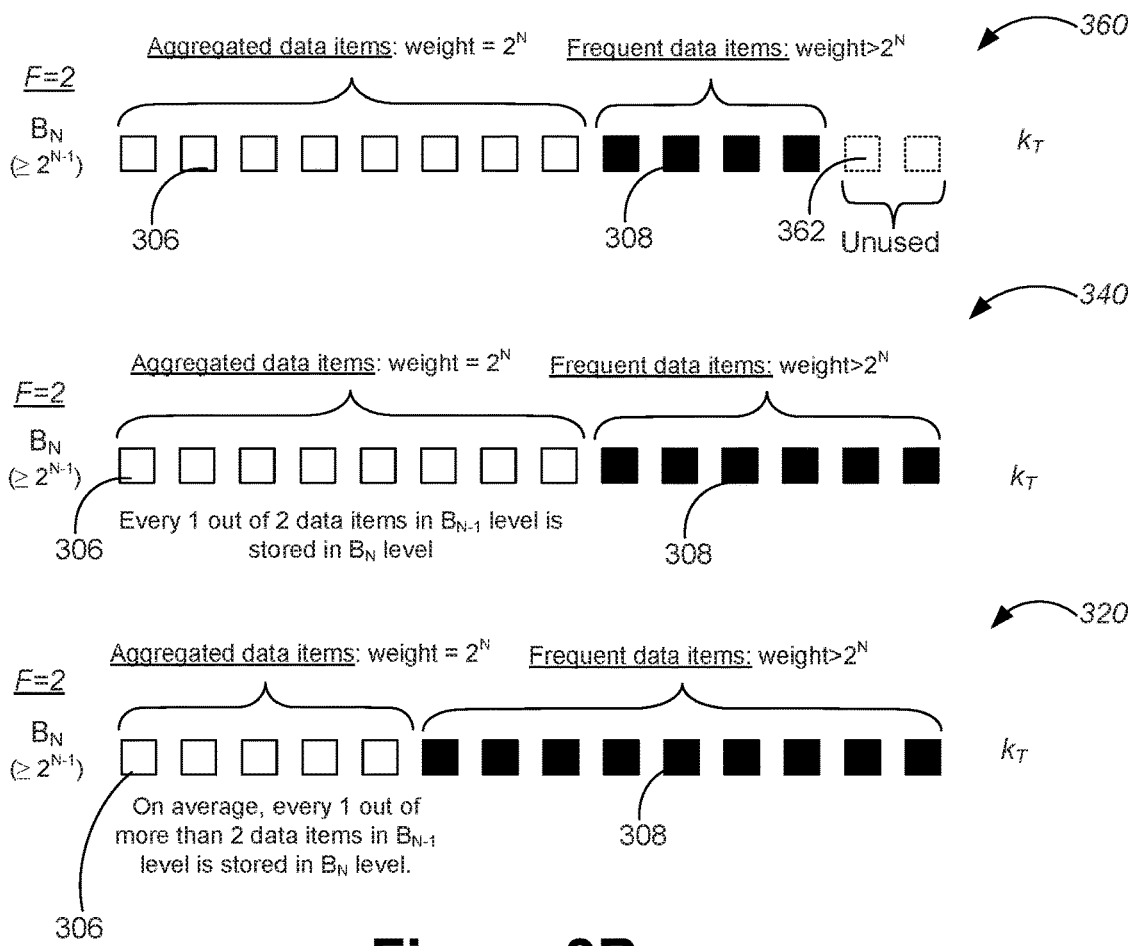

FIG. 3A illustrates a compactor hierarchy 300 that is applied to build a data sketch, in accordance with some embodiments, and FIG. 3B are three example top compaction levels $B_N$ 320, 340 and 360 in the compactor hierarchy 300, in accordance with some embodiments. The compactor hierarchy 300 includes a number N of compaction levels for aggregating data items obtained from an internal data source 240 or 290 or an external data source providing a stream of input data 102. Specifically, the compactor hierarchy 300 includes a first compaction level $B_1$ (also called a lowest or bottom compaction level), a second compaction level $B_2$ that is immediately above the first compaction level $B_1$, . . . , and an N-th compaction level $B_N$ (also called a top compaction level). The data items obtained from the internal or external data source are divided to a sequence of data item batches (e.g., batches 404A-404D in FIGS. 4A and 4B). Each data item batch is copied to the first compaction level, and gradually aggregated from the first compaction level $B_1$ to the top compaction level $B_N$. Data items associated with all compaction levels of the compactor hierarchy 300 collectively represent the plurality of data items provided by the internal or external data source, e.g., with an error ε that is less than a sketch error tolerance.

The computer system allocates N buffers in memory of the computer system for the N compaction levels of the compactor hierarchy 300. Each buffer has a respective storage space for storing a respective subset of the plurality of data items and a set of data weights corresponding to a respective compaction level, and each data item stored in the respective buffer is associated with a respective data weight. Specifically, a first number $k_1$ of data items of the plurality of data items are stored in a first buffer corresponding to the first compaction level $B_1$ of the N compaction levels. In some embodiments, the plurality of data items corresponds to a stream of data items that are received by the computer system sequentially, and therefore, can be divided into a sequence of data item batches. Each data item batch includes the first number $k_1$ of data items, such that the sequence of data item batches can be sequentially stored into the first buffer. Once one of the data item batches is aggregated to the second or top compaction level, the one of the data item batches is replaced with the next data item batch in the sequence of data item batches. Given the data items stored in the first buffer is copied from the plurality of data items provided by the data source, each data item of the first compaction level $B_1$ is associated with a first data weight of 1.

The first number $k_1$ of data items stored in the first buffer includes a first subset of data items 302 and a second subset of data items 304. Each of the first subset of data items 302 has been stored in an N-th buffer corresponding to the top compaction level $B_N$, and will not be sampled and aggregated to the second compaction level $B_2$ any more. In contrast, the second subset of data items 304 has not been stored in the N-th buffer corresponding to the top compaction level $B_N$, and is thereby sampled and aggregated to the second compaction level $B_2$. In some situations, the second subset of data items 304 is consolidated (i.e., de-duplicated) before the data items 304 are aggregated to the second compaction level $B_2$ and stored in the corresponding second buffer.

A second number $k_2$ of data items of the plurality of data items are stored in a second buffer corresponding to the second compaction level $B_2$ of the N compaction levels. Each data item stored in the second buffer is aggregated from a predefined compaction number F of data items in the first buffer, and therefore, has a data weight equal to the predefined compaction number F. Further, a third number $k_3$ of data items of the plurality of data items are stored in a third buffer corresponding to the third compaction level $B_3$ of the N compaction levels. In some embodiments, each data item stored in the third buffer is aggregated from the predefined compaction number F of data items in the second buffer, and therefore, has a data weight equal to a square of the predefined compaction number F, i.e., $F^2$. As such, in some embodiments, for the i-th compaction level an (i+1)-th number $k_{i+1}$ of data items are selected from an i-th number $k_i$ of data items stored in the i-th buffer corresponding to the i-th compaction level and stored in the (i+1)-th buffer corresponding to the (i+1)-th compaction level $B_{i+1}$ in the compactor hierarchy 300. N is an integer greater than 3, and i is an integer greater than 1 and less than N. Optionally, the i-th number $k_i$ is constantly scaled from the (i-1)-th number by the predefined compaction number F, i.e., $k_i = k_{i-1}/F$ (1=2, 3, . . . , N-1), and the data items in the i-th buffer share a data weight of $F^{i-1}$. The compaction number F is equal to the compaction factor F used elsewhere in this application.

A top level number $k_T$ of data items are stored in an Nth buffer corresponding to the top compaction level $B_N$ of the N compaction levels. The top level number $k_T$ of data items includes two subsets of data items, a subset of aggregated data items 306 and a subset of frequent data items 308. The subset of aggregated data items 306 are constantly aggregated and updated from an (N-1)-th buffer corresponding to an (N-1)-th compaction level $B_{N-1}$, and share a data weight of F. The subset of frequent data items 308 are originally aggregated from the (N-1)-th compaction level $B_{N-1}$, and subsequently reoccur at least once on the first compaction level $B_1$. When reoccurring on the first completion level $B_1$, a frequent data item is directly aggregated from the first compaction level $B_1$ to the N-th compaction level $B_{N-1}$ without being aggregated to any intermediate compaction level between the first and top compaction levels $B_1$ and $B_N$. Each frequent data item has a respective data weight that starts with $F^{N-1}$ and is individually counted based on a respective time of reoccurrence. In some situations, when an aggregated data item 306 reoccurs on the first completion level $B_1$, a corresponding data weight is increased by 1 when the reoccurred data item 306 is directly aggregated from the first completion level $B_1$, and the aggregated data item 306 is converted to a frequent data item 308 having the data weight greater than F.

Referring to FIG. 3B, in some embodiments, the N-th buffer 320 or 340 has a storage space that is entirely filled with the top level number $k_T$ of data items. The subset of aggregated data items 306 includes $k_A$ aggregated data items sharing a first data weight (e.g., $2^N$ when the compaction number F is 2), and the subset of frequent data items 308 includes $k_B$ frequent data items each having a respective data weight greater than the first data weight. For the N-th buffer 320, the number $k_B$ is greater than the number $k_A$, i.e., the top compaction level $B_N$ has more frequent data items than the aggregated data items. Conversely, for the N-th buffer 340, the number $k_A$ is greater than the number $k_B$, i.e., the top compaction level $B_N$ has more aggregated data items 306 than the frequent data items 308. Alternatively, in some embodiments, the N-th buffer 360 has a storage space that is not entirely filled with the top level number $k_T$ of data items, and has one or more unused data item spaces 362 that will be gradually filled by the aggregated data items 306 and/or frequent data items 308 when more data items are aggregated using the compactor hierarchy 300. Further, in some situations (e.g., at the beginning of receiving aggregated data items), there is no frequent data items 308 ($k_B$=0), and the N-th buffer 360 only stores the $k_A$ aggregated data items 306, regardless of whether the N-th buffer 360 is fully filled or has the unused data item spaces 362.

An Nth number $k_N$ of data items are aggregated from the (N−1)-th compaction level to the Nth compaction level, and stored in the Nth buffer as the aggregated data items 306. In some embodiments, the Nth number $k_N$ is equal to the (N−1)-th number $k_{N-1}$ divided by F (i.e., $k_{N-1}/F$). Under some circumstances, the number $k_A$ of aggregated data items existing in the Nth buffer is greater than $k_{N-1}/F$ (e.g., in the top compaction level 340), and $k_{N-1}/F$ of the number $k_A$ of aggregated data items are replaced with data items newly aggregated from the (N−1)-th compaction level. Every one out of F data items in the (N−1)-th compaction level is aggregated to the Nth compaction level. Under some circumstances, the number $k_A$ of aggregated data items existing in the Nth buffer is less than $k_{N-1}/F$ (e.g., in the top compaction level 320). Only $k_A$ data items are aggregated from the (N−1)-th compaction level to the Nth compaction level to replace the $k_A$ aggregated data items existing in the Nth buffer. The Nth number $k_N$ is equal to the number $k_A$ and less than $k_{N-1}/F$. Every one out of more than F data items in the (N−1)-th compaction level is aggregated to the Nth compaction level.

Figure 4A:
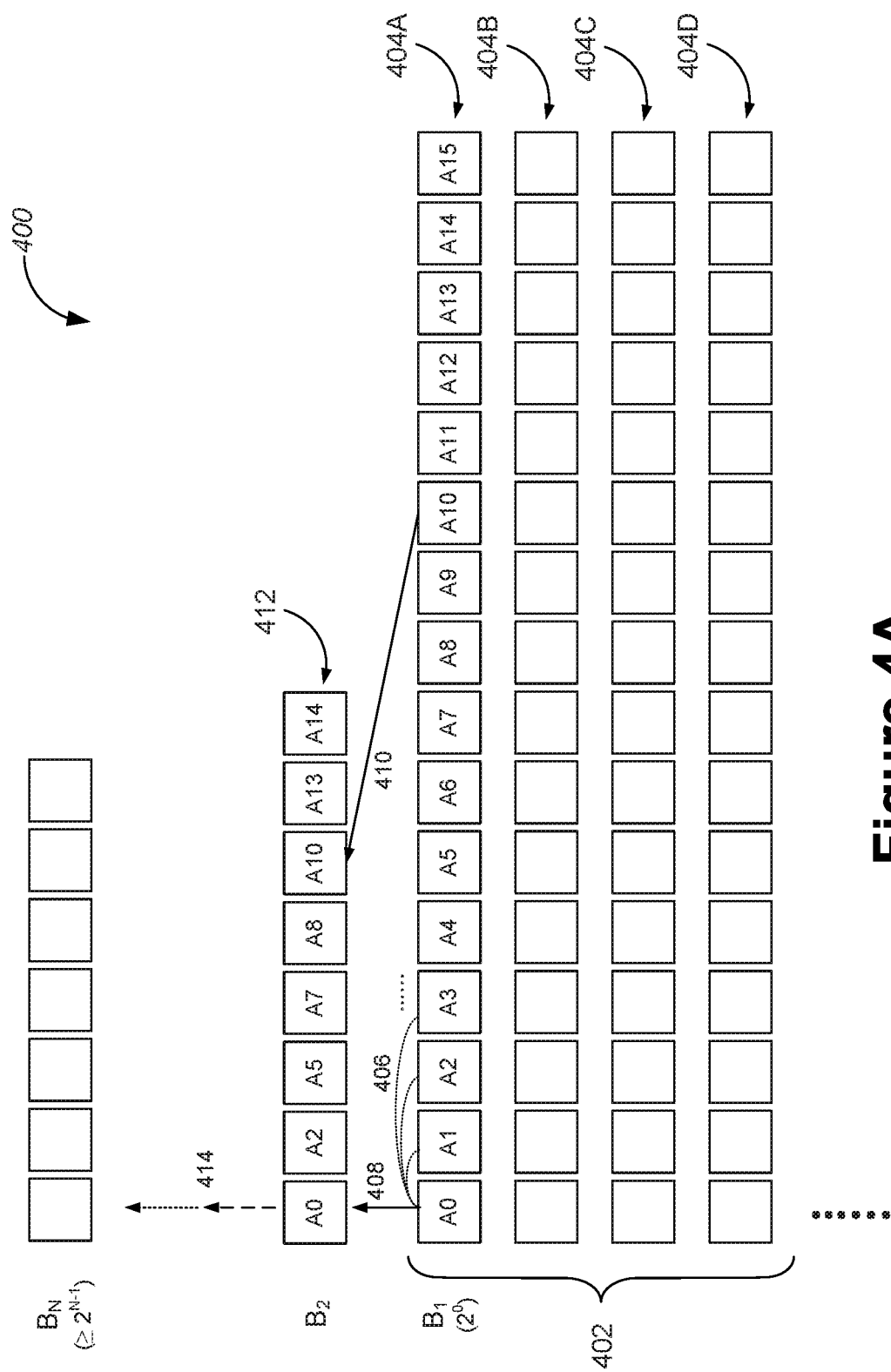
FIG. 4A is a flowchart of a process for aggregating a plurality of data items 402 to an empty top compaction level $B_N$ according to a compactor hierarchy 300, in accordance with some embodiments.

FIG. 4A is a flowchart of a process 400 for aggregating a plurality of data items 402 to an empty top compaction level $B_N$ according to a compactor hierarchy 300, in accordance with some embodiments. The plurality of data items 402 is obtained from an internal or external data source is divided to a sequence of data item batches, e.g., including data item batches 404A, 404B, 404C and 404D. Each data item batch 404 is copied to the first compaction level, and gradually aggregated from the first compaction level $B_1$ to the top compaction level $B_N$. Once each data item batch (e.g., a first batch 404A) copied to the first compaction level is aggregated to the second or N-th compaction level, the respective data item batch is replaced with a next data item batch (e.g., a second batch 404B) in the sequence of data item batches 404. For each intermediate compaction level $B_i$ distinct from the first and N-th compaction levels, the respective data items that are aggregated to the respective compaction level $B_i$ are further aggregated to a respective immediately higher compaction level $B_{i+1}$, and the respective compaction level $B_i$ is purged to receive more data items newly aggregated from a respective immediately lower compaction level $B_{i-1}$. For example, for the second compaction level $B_2$, the respective data items that are aggregated to the second compaction level $B_2$ are further aggregated to the third compaction level $B_3$, and the second compaction level $B_2$ is then purged to receive more data items newly aggregated from the first compaction level $B_1$. As such, data items associated with all compaction levels $B_1$-$B_N$ of the compactor hierarchy 300 collectively represent the plurality of data items 402 provided by the internal or external data source.

In some embodiments, the N-th buffer corresponding to the top compaction level $B_N$ is empty and does not store any data item 306 or 308. The data item batch 404A is currently stored in the first buffer corresponding to the first compaction level $B_1$. All data items in the data item batch 404A is consolidated before being aggregated to the second compaction level $B_2$. For example, the data item batch 404A includes four identical data items A0, A1, A2, and A3, and other data items A4-A15 that are not distinct from each other and from A0-A3. If the compaction factor F is equal to 2, the data items A0, A1, A2, and A3 are consolidated (406) to two of the data items A0-A3 and stored (408) into the second buffer corresponding to the second compaction level $B_2$, while six of the other data items A4-A15 are selected and stored (410) in into the second buffer corresponding to the second compaction level $B_2$. Optionally, the six of the other data items A4-A15 are randomly selected from the other data items A4-A15. As a result, data items 412 are stored in the second buffer corresponding to the second compaction level $B_2$.

Data items stored in each intermediate compaction level Bi are consolidated, and aggregated to an immediately higher compaction level $B_{i+1}$ according to the compaction factor F until the data items are aggregated to the top compaction level $B_N$. An (i+1)-th number $k_{i+1}$ of data items are from an i-th number $k_i$ of data items stored in the i-th buffer corresponding to the intermediate compaction level Bi. Specifically, in some embodiments, for each of the i-th number $k_i$ of data items, in accordance with a determination that the respective data item is repeated at least F times, the computer system selects the respective data item for storage in the (i+1)-th buffer once for every F times, and removes the respective data item and repeated data items from a selection pool. The remainder of the (i+1)-th number k+1 of data items is selected from the selection pool, e.g., randomly.

Figure 4B:
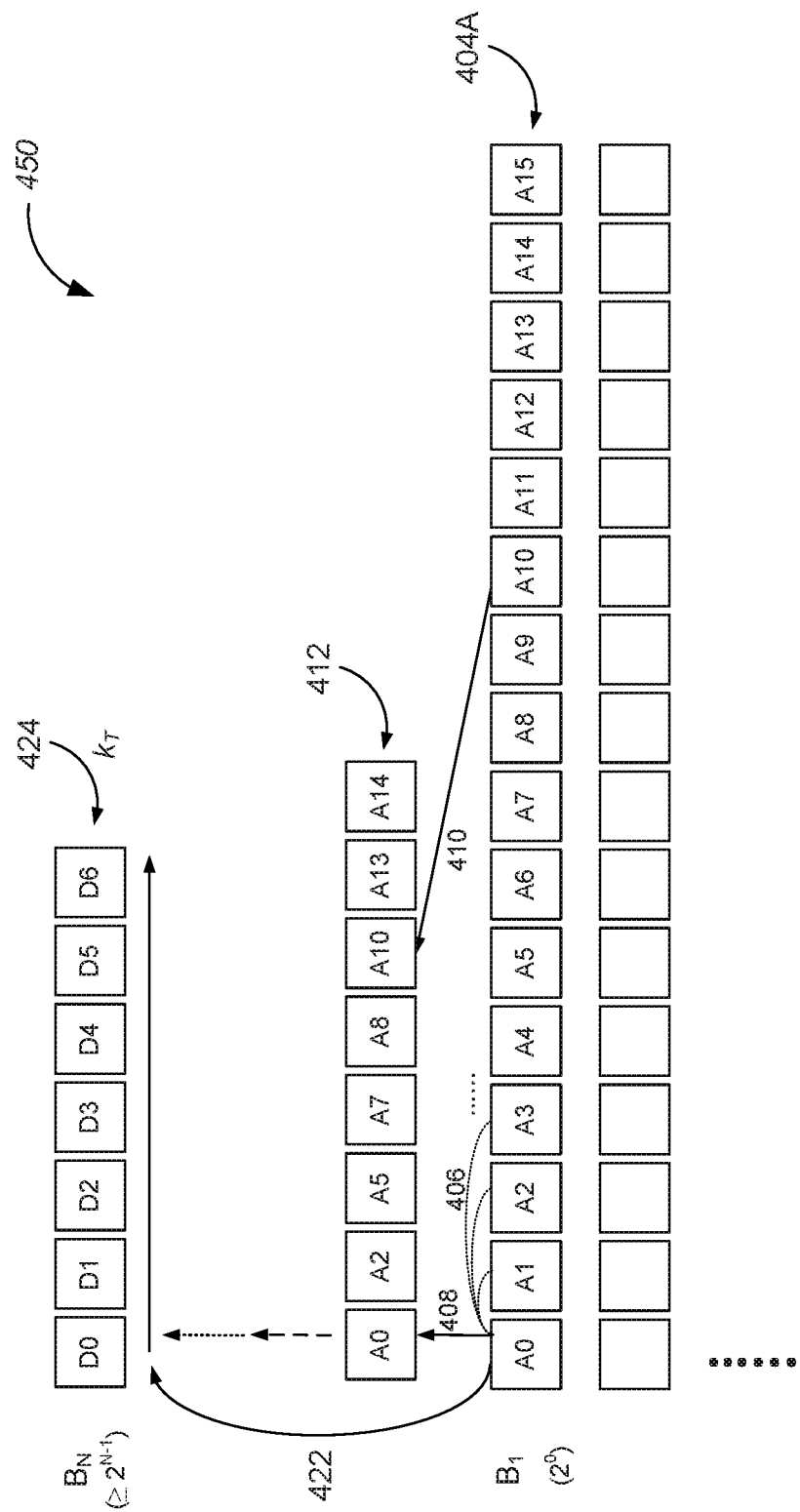
FIG. 4B is a flowchart of a process for aggregating a plurality of data items to a top compaction level $B_N$ that is at least partially occupied according to a compactor hierarchy, in accordance with some embodiments.

FIG. 4B is a flowchart of a process 450 for aggregating a plurality of data items 402 to a top compaction level $B_N$ that is at least partially occupied according to a compactor hierarchy 300, in accordance with some embodiments. Each data item stored in the first buffer corresponding to the first compaction level $B_1$ is compared (422) with the data items 424 stored in the N-th buffer corresponding to the top compaction level $B_N$. In some embodiments, none of the data items 404A currently stored in the first buffer matches the aggregated data items 306 stored in the N-th buffer. The data items 404A that are currently stored in the first buffer are consolidated (406) and aggregated/stored (408 and 410) into the second buffer corresponding to the second compaction level $B_2$. As such, the data items 412 are stored in the second buffer corresponding to the second compaction level $B_2$.

Alternatively, in some embodiments, for a first subset of the data items stored in the first buffer, it is determined that each data item in the first subset matches a respective one of the data items 424 (which is optionally a previously aggregated data item 306 or a frequent data item 308) stored in the Nth buffer, and a corresponding data weight of the respective one of the data items 424 stored in the Nth buffer is increased by 1. A second subset of the data items 404A stored in the first buffer complements the first subset of the data items 404A. Each data item in the second subset does not match any data items 424 stored in the Nth buffer. A second number $k_2$ of data items is selected in the second subset of data items stored in the first buffer and stored in the second buffer corresponding to a second compaction level $B_2$ in the compactor hierarchy 300.

Data items stored in each intermediate compaction level Bi are not compared with the data items 424 stored in the Nth buffer. Rather, they are directly consolidated and aggregated to an immediately higher compaction level $B_{i+1}$ according to the compaction factor F until the data items are aggregated to the top compaction level $B_N$. An (i+1)-th number $k_{i+1}$ of data items are from an i-th number $k_i$ of data items stored in the i-th buffer corresponding to the intermediate compaction level Bi. Specifically, in some embodiments, for each of the i-th number $k_i$ of data items, in accordance with a determination that the respective data item is repeated at least F times, the computer system selects the respective data item for storage in the (i+1)-th buffer once for every F times, and removes the respective data item and repeated data items from a selection pool. The remainder of the (i+1)-th number k+1 of data items is selected from the selection pool, e.g., randomly.

The (N−1)-th buffer corresponding to the (N−1)-th compaction level stores an (N−1)-th number $k_{N-1}$ of data items. Among the (N−1)-th number $k_{N-1}$ of data items, an Nth number $k_N$ of data items are optionally aggregated to the top compaction level $B_N$ with a data weight of F. In some embodiments, the Nth number $k_N$ is equal to $k_{N-1}/F$. Referring to FIG. 3B, in some embodiments, before the Nth number $k_N$ of data items are aggregated to the top compaction level $B_N$, the Nth buffer corresponding to the top compaction level $B_N$ has one or more unused spaces 362. The Nth number $k_N$ of data items are stored in the one or more unused spaces 362 first. In some situations, if the one or more unused spaces 362 are not sufficient to store a subset of the Nth number $k_N$ of data items, one or more existing aggregated data items 306 that have already been stored in the Nth buffer are purged and replaced with the subset of the Nth number $k_N$ of data items. In an example, the one or more existing aggregated data items 306 are randomly selected to create space for the subset of the Nth number $k_N$ of data items that also corresponds to the data weight of $F^{N-1}$. Alternatively, in some embodiments, before the Nth number $k_N$ of data items are aggregated to the top compaction level $B_N$, the Nth buffer corresponding to the top compaction level $B_N$ has been fully occupied without any unused spaces 362. A subset of existing aggregated data items 306 that has already been stored in the Nth buffer are purged and replaced with the Nth number $k_N$ of data items newly aggregated from the (N−1)-th compaction level $B_{N-1}$.

Referring to FIG. 3B, in some embodiments, a combination of the unused spaces 362 and a storage space for storing the existing aggregated data items 306 is not sufficient to store the Nth number $k_N$ of data items newly aggregated from the (N−1)-th compaction level $B_{N-1}$ if $k_N$ is equal to $k_{N-1}/F$. The number $k_N$ of data items selected from (N−1)-th compaction level $B_{N-1}$ is adjusted accordingly, and a subset of the $k_{N-1}/F$ data items is selected and stored in the unused spaces 362 (if any) and in place of a subset or all of the existing aggregated data items 306 according to an aggregation rule.

Figure 5A:
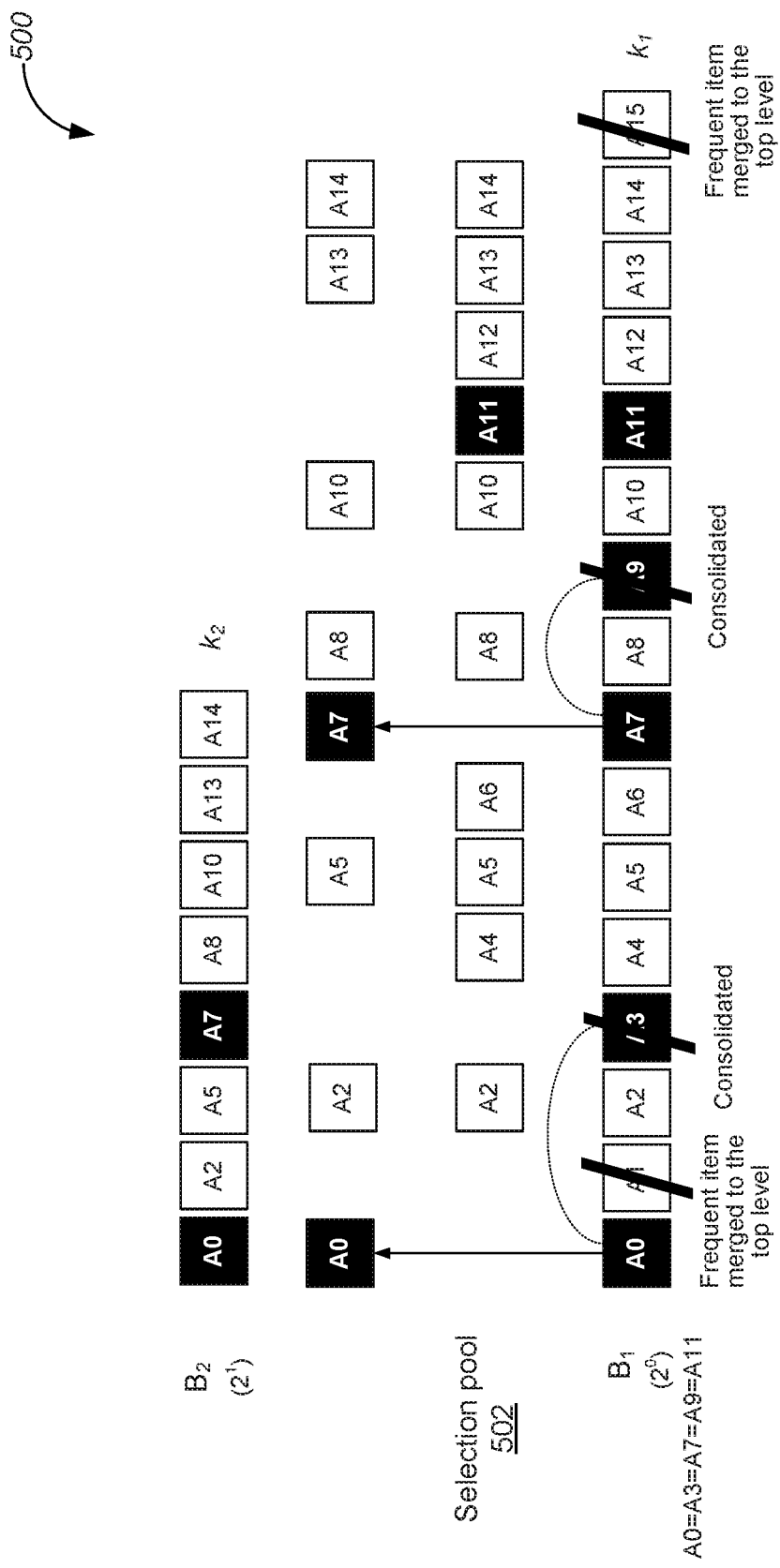
FIG. 5A illustrates a process for aggregating data items in a first (i.e., lowest) compaction level $B_1$ to a second compaction level $B_2$ according to a compactor hierarchy 300, in accordance with some embodiments.

FIG. 5A illustrates a process 500 for aggregating data items in a first (i.e., lowest) compaction level $B_1$ to a second compaction level $B_2$ according to a compactor hierarchy 300, in accordance with some embodiments. The compaction hierarchy 300 has a compaction factor of 2. Each data item stored in a first buffer corresponding to the first compaction level $B_1$ is compared with a top level number $k_T$ of data items (e.g., data items 424 in FIG. 4B) stored in the Nth buffer corresponding to the top compaction level $B_N$. If the respective data item stored in the first buffer matches one of the data items stored in the Nth buffer, a corresponding data weight of the respective data item stored in the Nth buffer increases by 1, and the respective data item is deleted from a selection pool 502 used to select data items of the first compaction level $B_1$ to be aggregated to a second compaction level $B_2$. In these embodiments, a first buffer corresponding to the first compaction level $B_1$ stores data items A0-A15, and two distinct data items A1 and A15 match two data items stored in the Nth buffer. Each of the data weights of the matched two data items stored in the Nth buffer is increased by 1, and the data items A1 and A15 are not added to the selection pool 502, i.e., not considered for being aggregated to the second compaction level $B_2$.

In some embodiments, each of the data items A0-A15 corresponds to a data row having a plurality of data fields. The data items A0-A15 are aggregated to the second or top compaction levels according to a data query criterion. The data query criterion is defined based on a subset of the plurality of data fields. That said, each data item stored in the first buffer is compared with the top level number $k_T$ of data items stored in the Nth buffer based on the subset of the plurality of data fields to determine whether the respective data item stored in the first buffer matches one of the data items stored in the Nth buffer. Further, when a user query is received to request information concerning a rank of data items in the compaction hierarchy 300, the rank is determined based on the subset of the plurality of data fields of data items in the compaction hierarchy 300 as well.

After the data items A1 and A15 are directly aggregated to the top compaction level $B_N$, the selection pool includes the data items A0 and A2-A14 among which the data item A0 is equal to the data items A3, A7, A9, and A11. The data items A0 and A3 are consolidated, and the data item A0 is stored in the second buffer corresponding to the second compaction level $B_2$. The data items A7 and A9 are consolidated, and the data item A7 is stored in the second buffer corresponding to the second compaction level $B_2$. Given that the compaction factor F is equal to 2, the data item A11 remains in the selection pool 502. The selection pool 502 includes the remainder of the data items A0-A15, i.e., the data items A2, A4, A5, A6, A8, and A10-A14, which are distinct from each other.

The second buffer corresponding to the second compaction level $B_2$ stores a second number $k_2$ of data items. A subset of the second number $k_2$ of data items are directly consolidated from the data items stored in the first buffer, and the remainder of the second number $k_2$ of data items is selected from the selection pool 502, e.g., randomly or according to a selection rule. In this example of FIG. 5, the compaction factor F is equal to 2, and the second number $k_2$ is therefore equal to half of the first number $k_1$. Two data items A0 and A7 are consolidated from the first buffer directly, and another six data items are selected from the selection pool 502 including the data items A2, A4, A5, A6, A8, and A10-A14. The data items A2, A5, A8, A10, A13, and A14 are selected. As a result, the data items A0, A2, A5, A7, A8, A10, A13, and A14 are aggregated from the first compaction level $B_1$ to the second compaction level $B_2$.

Figure 5B:
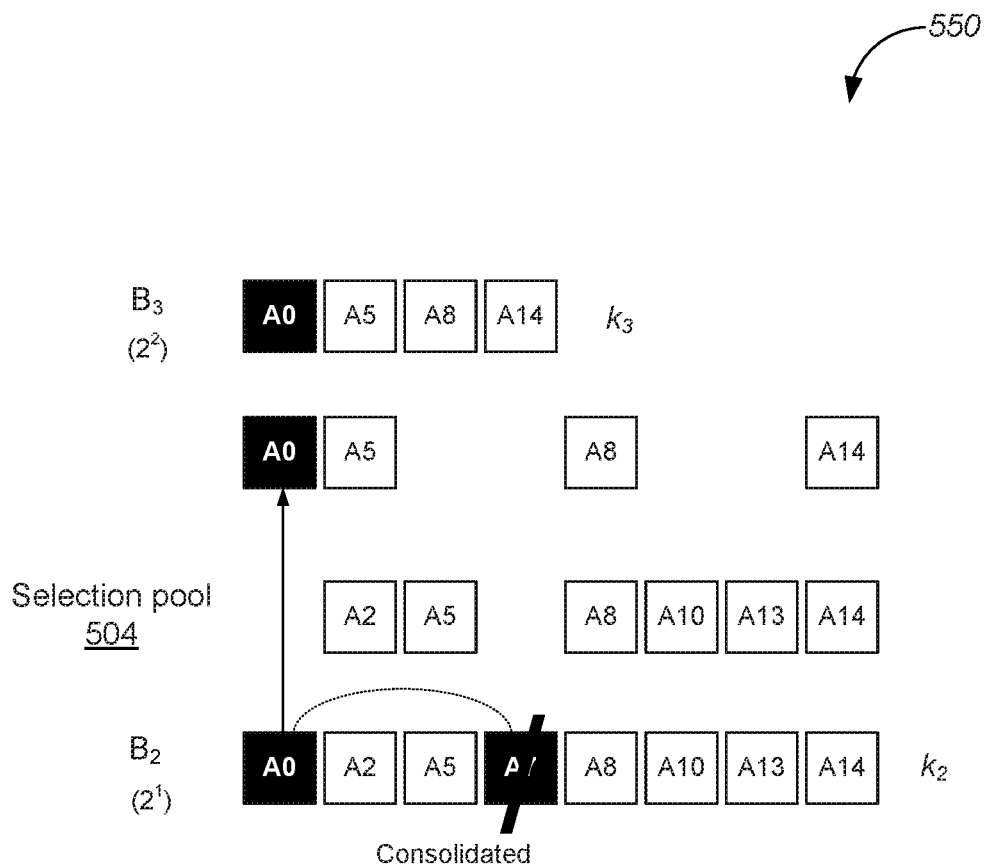
FIG. 5B illustrates a process for aggregating data items from an intermediate compaction level $B_i$ to an immediately higher compaction level $B_{i+1}$ according to a compactor hierarchy 300, in accordance with some embodiments.
Figure 6A:
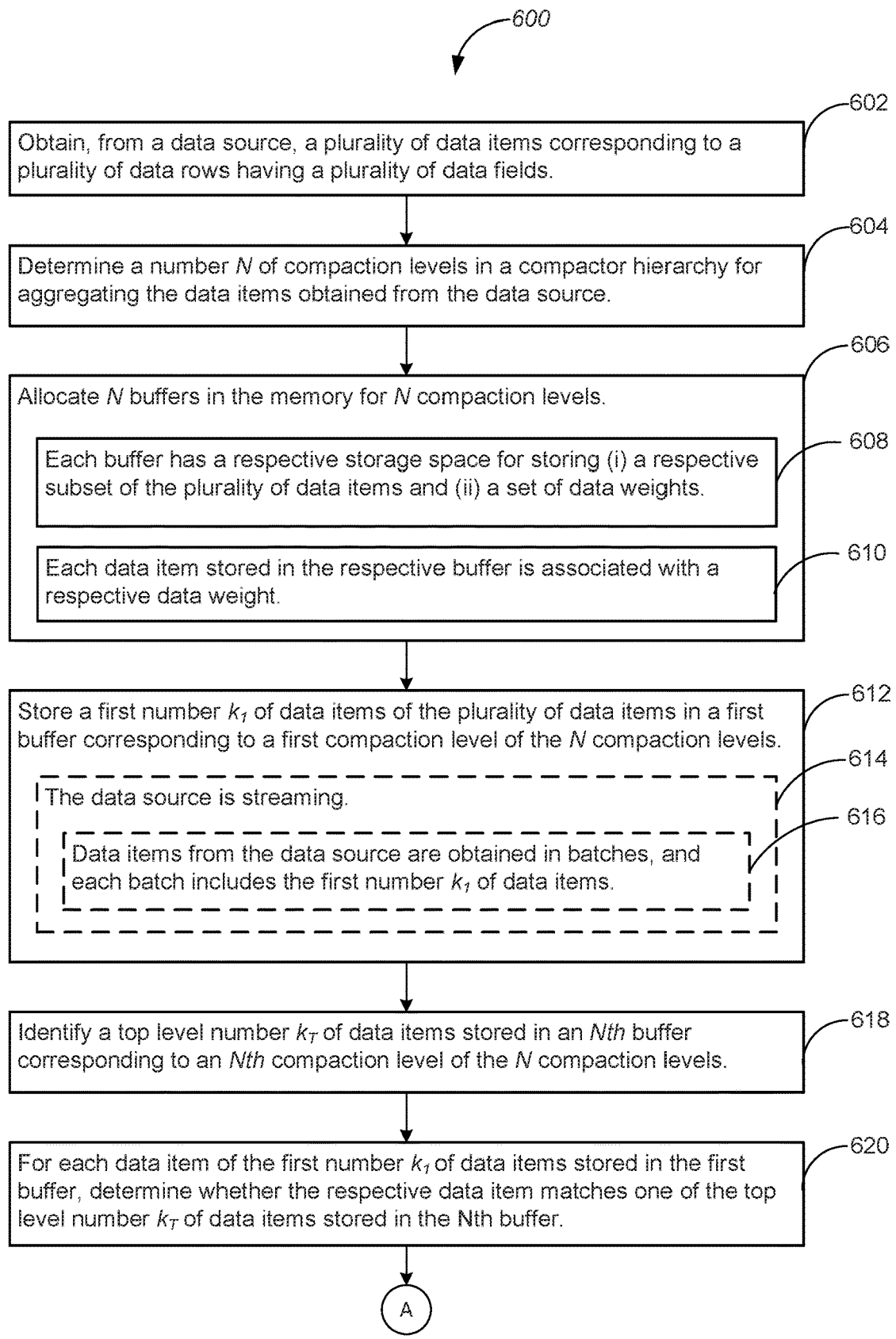
FIGS. 6A-6D provide a flowchart of a process for building and using a data sketch, in accordance with some embodiments.
Figure 6B:
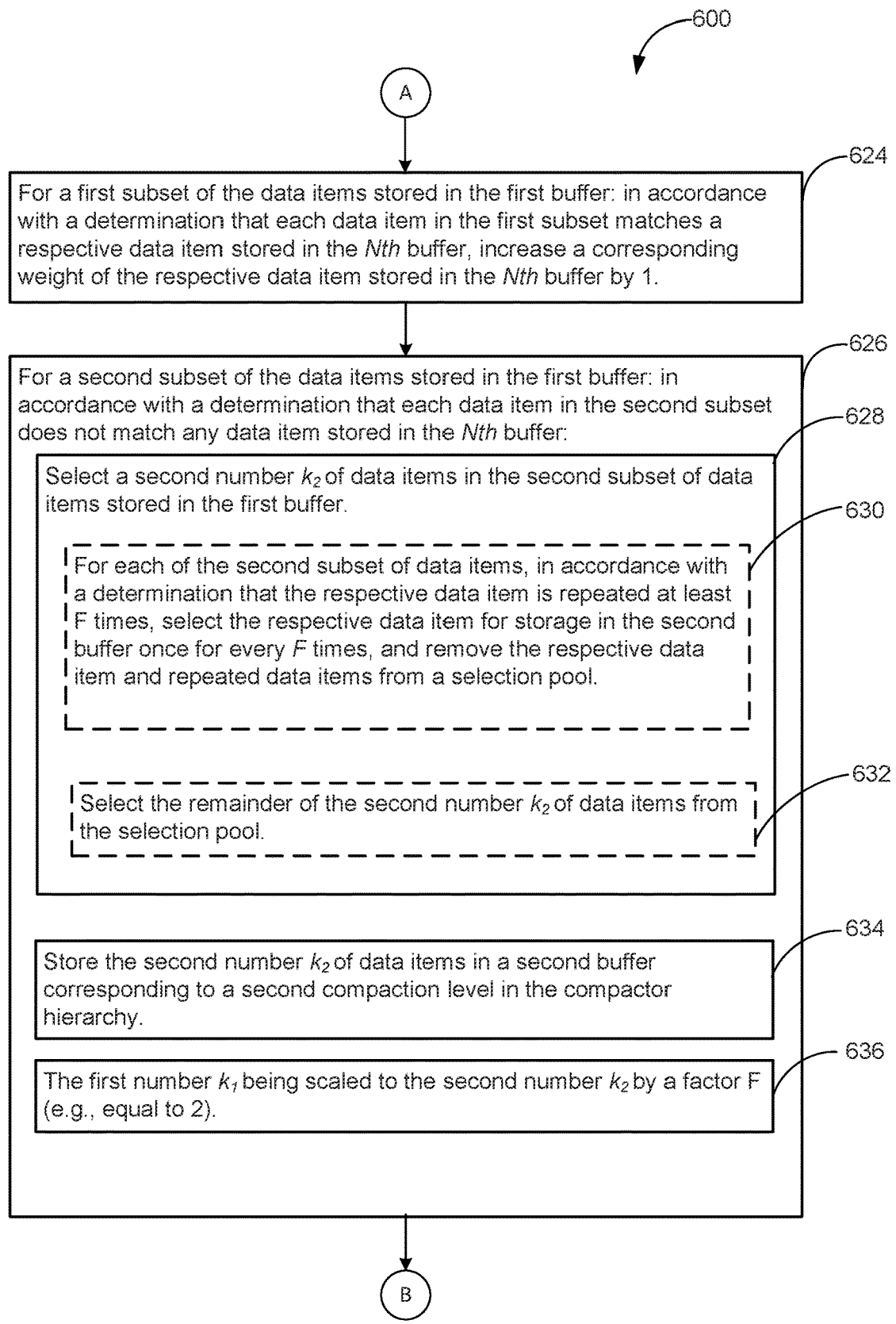
Figure 6C:
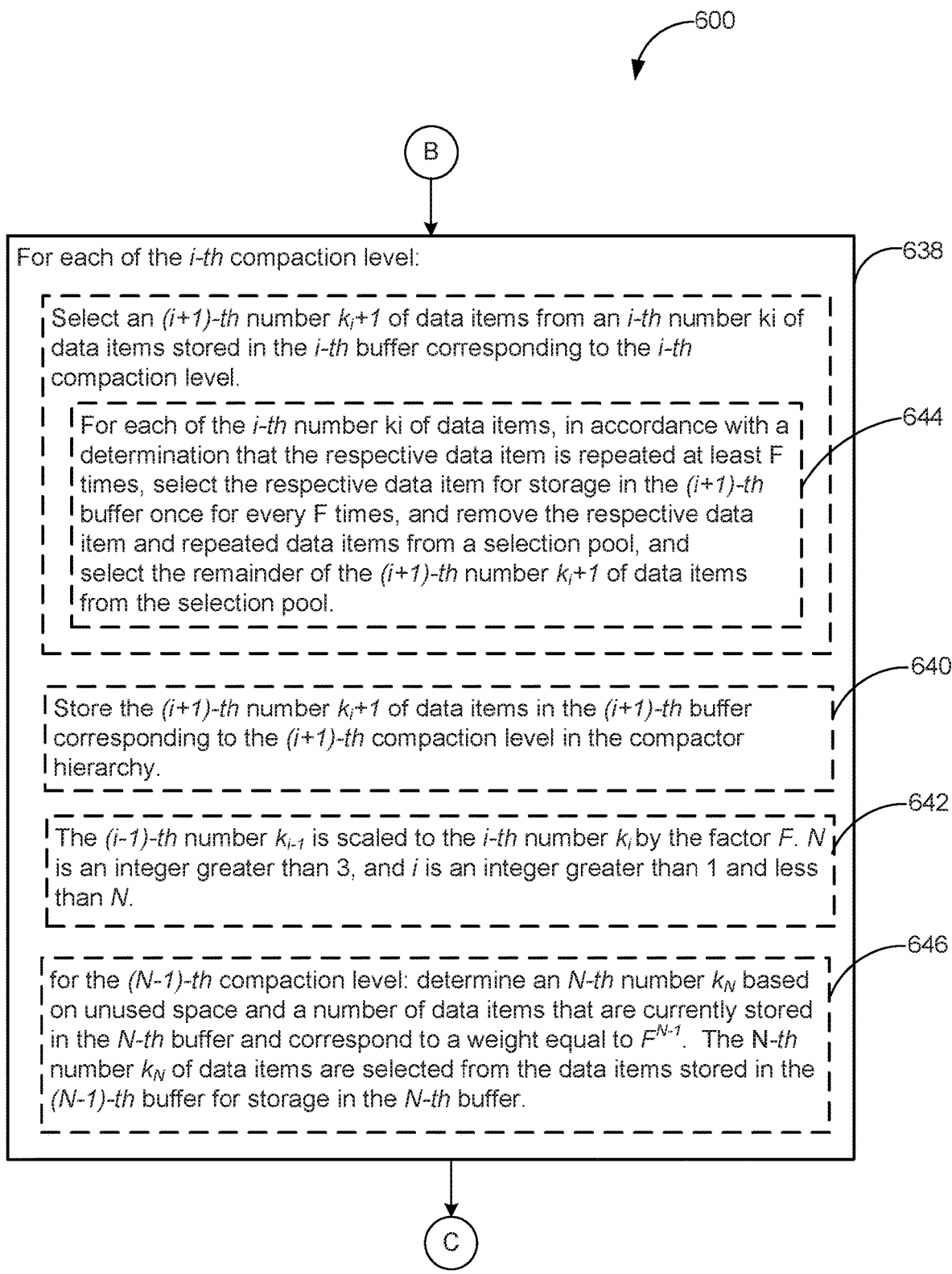
Figure 6D:
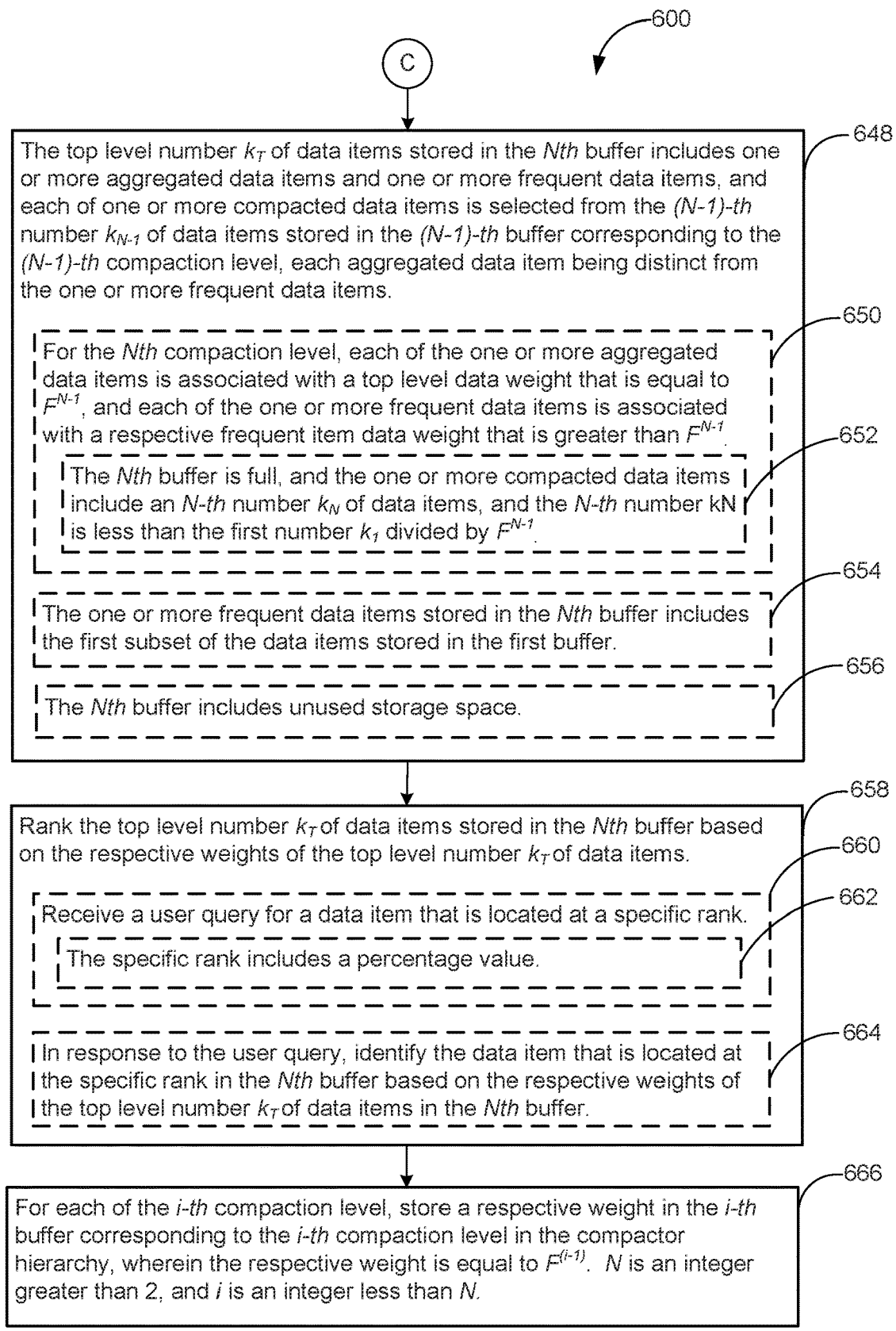

FIG. 5B illustrates a process 550 for aggregating data items from an intermediate compaction level $B_i$ to an immediately higher compaction level $B_{i+1}$ according to a compactor hierarchy 300, in accordance with some embodiments. For example, data items stored in a second buffer corresponding to a second compaction level $B_2$ is aggregated to a third buffer corresponding to a third compaction level $B_3$. The data items stored in an i-th buffer corresponding to intermediate compaction level $B_i$ are not compared with the data items of the top compaction level $B_N$, and cannot be directly aggregated to the top compaction level $B_N$ in accordance with a determination whether the data items in the i-th buffer match the data items stored in the N-th buffer. Rather, the data items stored in the intermediate compaction level $B_i$ are consolidated and aggregated to the immediately higher compaction level $B_{i+1}$.

In this example, the third buffer stores the third number $k_3$ of data items. The data item A0 is equal to the data item A7. The data items A0 and A7 are consolidated, and the data item A0 is stored in the third buffer corresponding to the third compaction level $B_3$. The data items A0 and A7 are not added to a selection pool 504 used to select data items of the second compaction level $B_2$ to be aggregated to the third compaction level $B_3$. The selection pool 504 includes the remainder of the data items stored in the second buffer, e.g., the data items A2, A5, A8, A10, A13, and A14. The compaction factor is equal to 2, and the third number $k_3$ is therefore equal to half of the second number $k_2$. One data item A0 is consolidated directly from the second buffer, and another three data items are selected from the selection pool 504 to fill the third number $k_3$ of data items stored in the third buffer, e.g., randomly or according to the selection rule.

FIGS. 6A-6D provide a flowchart of a process 600 for building and using a data sketch, in accordance with some embodiments. The process 600 is performed at a computer system having one or more processors and memory. The memory stores one or more programs configured for execution by the one or more processors. The computer system obtains (602), from a data source, a plurality of data items corresponding to a plurality of data rows having a plurality of data fields, and determines (604) a number N of compaction levels in a compactor hierarchy for aggregating the data items obtained from the data source. N buffers are allocated (606) in the memory for N compaction levels. Each buffer has (608) a respective storage space for storing a respective subset of the plurality of data items and a set of data weights. Each data item stored in the respective buffer is associated (610) with a respective data weight. The computer system stores (612) a first number $k_1$ of data items of the plurality of data items in a first buffer corresponding to a first compaction level of the N compaction levels. In some embodiments, the data source is streaming (614). Data items from the data source may be obtained (616) in batch, and each batch includes the first number $k_1$ of data items.

The computer system identifies (618) a top level number $k_T$ of data items stored in an Nth buffer corresponding to an Nth compaction level of the N compaction levels. For each data item of the first number $k_1$ of data items stored in the first buffer, the computer system determines (620) whether the respective data item matches one of the top level number $k_T$ of data items stored in the Nth buffer. For a first subset of the data items stored in the first buffer, it is determined that each data item in the first subset matches a respective data item stored in the Nth buffer, and the computer system increases (624) a corresponding data weight of the respective data item stored in the Nth buffer by 1. In contrast, for a second subset of the data items stored in the first buffer, it is determined (626) that each data item in the second subset does not match any data item stored in the Nth buffer. The computer system selects (628) a second number $k_2$ of data items in the second subset of data items stored in the first buffer and stores (634) the second number $k_2$ of data items in a second buffer corresponding to a second compaction level in the compactor hierarchy. The first number $k_1$ is scaled (636) to the second number $k_2$ by a compaction factor F (e.g., equal to 2).

In some embodiments, for each of the i-th compaction level, the computer system selects (638) an (i+1)-th number $k_{i+1}$ of data items from an i-th number $k_i$ of data items stored in the i-th buffer corresponding to the i-th compaction level, and stores (642) the (i+1)-th number $k_{i+1}$ of data items in the (i+1)-th buffer corresponding to the (i+1)-th compaction level in the compactor hierarchy. The i-th number $k_i$ is scaled (642) from the (i−1)-th number $k_{i-1}$ by the compaction factor F. N is an integer greater than 3, and i is an integer greater than 1 and less than N. In some embodiments, for each of the i-th number $k_i$ of data items, when it is determined that the respective data item is repeated for a multiple of F times, the respective data item is selected (644) for storage in the (i+1)-th buffer once for every F times, and the respective data item and repeated data items are removed from a selection pool. The remainder of the (i+1)-th number $k_{i+1}$ of data items is then selected from the selection pool. Additionally, in some embodiments, an N-th number $k_N$ is determined (646) based on unused space and/or a number of data items that are currently stored in the N-th buffer and correspond to a data weight equal to F. The N-th number $k_N$ of data items are selected from the data items stored in the (N−1)-th buffer for storage in the Nth buffer. The N-th number $k_N$ is optionally equal to or smaller than the (N−1)-th number $k_{N-1}$ divided by F.

In some embodiments, the top level number $k_T$ of data items stored in the Nth buffer includes (648) one or more aggregated data items 306 and one or more frequent data items 308. Each of one or more aggregated data items 304 is selected from the (N−1)-th number $k_{N-1}$ of data items stored in the (N−1)-th buffer corresponding to the (N−1)-th compaction level. Each aggregated data 306 item is distinct from the one or more frequent data items 308. For the Nth compaction level, each of the one or more aggregated data items 306 may be associated (650) with a top level data weight that is equal to $F^{N-1}$, and each of the one or more frequent data items 308 may be associated with a respective frequent item data weight that is greater than $F^{N-1}$. Further, in some embodiments, the Nth buffer is full, and the one or more aggregated data items 306 include an N-th number $k_N$ of data items, and the Nth number $k_N$ of data items is less (652) than the first number $k_1$ divided by $F^{N-1}$, e.g., because there are too many frequent data items on the top compaction level. In some embodiments, the one or more frequent data items 308 stored in the Nth buffer includes (654) the first subset 302 of the data items stored in the first buffer. In some embodiments, the Nth buffer includes (656) unused storage space 362. More details on the top level number $k_T$ of data items stored in the Nth buffer are discussed above with reference to FIGS. 3A and 3B.

In some embodiments, the computer system ranks (658) the top level number $k_T$ of data items stored in the Nth buffer based on the respective data weights of the top level number $k_T$ of data items. Upon receiving (660) a user query for a data item that is located at a specific rank, the computer system identifies (664) the data item that is located at the specific rank in the Nth buffer based on the respective weights of the top level number $k_T$ of data items in the Nth buffer. The specific rank optionally includes (662) a percentage value. Alternatively, in some embodiments, the computer system ranks all data items stored in the N buffers associated with the compactor hierarchy 300 based on the respective data weight of each data item. Upon receiving a user query for a data item that is located at a specific rank, the computer system identifies (664) the data item that is located at the specific rank among the data items stored in the N buffers based on the respective weight of each data item stored in the N buffers corresponding to the compactor hierarchy 300.

In some embodiments, a respective data weight is stored (666) for each of the i-th compaction level in the i-th buffer corresponding to the i-th compaction level in the compactor hierarchy. The respective weight is equal to $F^{i-1}$. This applies when N is an integer greater than 2, and i is an integer less than N.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of data sketching, comprising:
   at a computer system having one or more processors and memory storing one or more programs configured for execution by the one or more processors:
   obtaining, from a data source, a plurality of data items corresponding to a plurality of data rows, each having a plurality of data fields;
   determining a number N of compaction levels in a compactor hierarchy for aggregating the data items obtained from the data source;
   allocating N buffers in the memory for N compaction levels, wherein each buffer has a respective storage space for storing (i) a respective subset of the plurality of data items and (ii) a set of data weights, and each data item stored in the respective buffer is associated with a respective data weight;
   storing a first number $k_1$ of data items of the plurality of data items in a first buffer corresponding to a first compaction level of the N compaction levels;
   identifying a top level number $k_T$ of data items stored in an Nth buffer corresponding to an Nth compaction level of the N compaction levels;
   for each data item of the first number $k_1$ of data items stored in the first buffer, determining whether the respective data item matches one of the top level number $k_T$ of data items stored in the Nth buffer;
   for a first subset of the data items stored in the first buffer:
   in accordance with a determination that each data item in the first subset matches a respective data item stored in the Nth buffer, increasing a corresponding data weight of the respective data item stored in the Nth buffer by 1; and
   for a second subset of the data items stored in the first buffer,
   in accordance with a determination that each data item in the second subset does not match any data item stored in the Nth buffer, selecting a second number $k_2$ of data items in the second subset of data items stored in the first buffer and storing the second number $k_2$ of data items in a second buffer corresponding to a second compaction level in the compactor hierarchy, the first number $k_1$ being scaled to the second number $k_2$ by a compaction factor F.

2. The method of claim 1, wherein the data source is streaming.

3. The method of claim 2, wherein data items from the data source are obtained in batches, and each batch includes the first number $k_1$ of data items.

4. The method of claim 1, further comprising:
   assigning a respective rank to each of the data items in the Nth buffer based on the respective data weights of the top level number $k_T$ of data items.

5. The method of claim 4, further comprising:
   receiving a user query for a data item that has a user-specified rank; and
   in response to the user query, identifying a data item having the user-specified rank in the Nth buffer according to the respective data weights of the top level number $k_T$ of data items in the Nth buffer.

6. The method of claim 5, wherein the specific rank includes a percentage value.

7. The method of claim 1, wherein the compaction factor F is equal to 2.

8. The method of claim 1, further comprising, for each of the i-th compaction level:
   selecting an (i+1)-th number $k_{i+1}$ of data items from an i-th number $k_i$ of data items stored in the i-th buffer corresponding to the i-th compaction level; and
   storing the (i+1)-th number $k_{i+1}$ of data items in the (i+1)-th buffer corresponding to the (i+1)-th compaction level in the compactor hierarchy;
   wherein N is an integer greater than 3, and i is an integer greater than 1 and less than N; and
   wherein the i-th number $k_i$ (i<N−1) is scaled to the (i+1)-th number $k_{i+1}$ by the compaction factor F.

9. The method of claim 8, further comprising:
   determining an N-th number $k_N$ based on unused space and/or a number of data items that are currently stored in the N-th buffer and correspond to a data weight equal to $F^{N-1}$, wherein the N-th number $k_N$ of data items are selected from the data items stored in the (N−1)-th buffer for storage in the N-th buffer.

10. The method of claim 8, wherein for each of the i-th compaction levels, selecting an (i+1)-th number $k_{i+1}$ of data items from an i-th number $k_i$ of data items further comprising:
  for each of the i-th number $k_i$ of data items, in accordance with a determination that the respective data item is repeated for a multiple of F times, selecting the respective data item for storage in the (i+1)-th buffer once for every F times, and removing the respective data item and repeated data items from a selection pool; and
  selecting the remainder of the (i+1)-th number $k_{i+1}$ of data items from the selection pool.

11. The method of claim 1, wherein:
  the top level number $k_T$ of data items stored in the Nth buffer includes one or more aggregated data items and one or more frequent data items;
  each of one or more aggregated data items is selected from the (N−1)-th number $k_{N-1}$ of data items previously or currently stored in the (N−1)-th buffer corresponding to the (N−1)-th compaction level; and
  each aggregated data item is distinct from the one or more frequent data items.

12. The method of claim 11, wherein for the Nth compaction level, each of the one or more aggregated data items is associated with a top level data weight that is equal to $F^{N-1}$, and each of the one or more frequent data item is associated with a respective frequent item data weight that is greater than $F^{(N-1)}$.

13. The method of claim 12, wherein the Nth buffer is full, and the one or more aggregated data items include an N-th number $k_N$ of data items, and the N-th number $k_N$ is less than the first number $k_1$ divided by $F^{N-1}$.

14. The method of claim 11, wherein the one or more frequent data items stored in the Nth buffer includes the first subset of the data items stored in the first buffer.

15. The method of claim 11, wherein the Nth buffer includes unused storage space.

16. The method of claim 1, further comprising, for each of the i-th compaction level:
  storing a respective data weight in the i-th buffer corresponding to the i-th compaction level in the compactor hierarchy, wherein the respective data weight is equal to $F^{(i-1)}$;
  wherein N is an integer greater than 2, and i is an integer less than N.

17. The method of claim 1, wherein selecting the second number $k_2$ of data items in the second subset of data items stored in the first buffer further comprising:
  for each of the second subset of data items, in accordance with a determination that the respective data item is repeated for a multiple of F times, selecting the respective data item for storage in the second buffer once for every F times, and removing the respective data item and repeated data items from a selection pool; and
  selecting the remainder of the second number $k_2$ of data items from the selection pool.

18. The method of claim 17, wherein the remainder of the second number $k_2$ of data items is randomly selected from the selection pool.

19. A computer system having one or more computing devices, each computing device having one or more processors and memory, wherein the memory stores one or more programs configured for execution by the one or more processors, and the one or more programs comprise instructions for:
  obtaining, from a data source, a plurality of data items corresponding to a plurality of data rows, each having a plurality of data fields;
  determining a number N of compaction levels in a compactor hierarchy for aggregating the data items obtained from the data source;
  allocating N buffers in the memory for N compaction levels, wherein each buffer has a respective storage space for storing (i) a respective subset of the plurality of data items and (ii) a set of data weights, and each data item stored in the respective buffer is associated with a respective data weight;
  storing a first number $k_1$ of data items of the plurality of data items in a first buffer corresponding to a first compaction level of the N compaction levels;
  identifying a top level number $k_T$ of data items stored in an Nth buffer corresponding to an Nth compaction level of the N compaction levels;
  for each data item of the first number $k_1$ of data items stored in the first buffer, determining whether the respective data item matches one of the top level number $k_T$ of data items stored in the Nth buffer;
  for a first subset of the data items stored in the first buffer:
    in accordance with a determination that each data item in the first subset matches a respective data item stored in the Nth buffer, increasing a corresponding data weight of the respective data item stored in the Nth buffer by 1; and
  for a second subset of the data items stored in the first buffer,
    in accordance with a determination that each data item in the second subset does not match any data item stored in the Nth buffer, selecting a second number $k_2$ of data items in the second subset of data items stored in the first buffer and storing the second number $k_2$ of data items in a second buffer corresponding to a second compaction level in the compactor hierarchy, the first number $k_1$ being scaled to the second number $k_2$ by a compaction factor F.

20. A non-transitory computer readable storage medium storing one or more programs configured for execution by a computer system having one or more processors, memory, and a display, the one or more programs comprising instructions for:
  obtaining, from a data source, a plurality of data items corresponding to a plurality of data rows, each having a plurality of data fields;
  determining a number N of compaction levels in a compactor hierarchy for aggregating the data items obtained from the data source;
  allocating N buffers in the memory for N compaction levels, wherein each buffer has a respective storage space for storing (i) a respective subset of the plurality of data items and (ii) a set of data weights, and each data item stored in the respective buffer is associated with a respective data weight;
  storing a first number $k_1$ of data items of the plurality of data items in a first buffer corresponding to a first compaction level of the N compaction levels;
  identifying a top level number $k_T$ of data items stored in an Nth buffer corresponding to an Nth compaction level of the N compaction levels;
  for each data item of the first number $k_1$ of data items stored in the first buffer, determining whether the respective data item matches one of the top level number $k_T$ of data items stored in the Nth buffer;
  for a first subset of the data items stored in the first buffer:

in accordance with a determination that each data item in the first subset matches a respective data item stored in the Nth buffer, increasing a corresponding data weight of the respective data item stored in the Nth buffer by 1; and for a second subset of the data items stored in the first buffer, in accordance with a determination that each data item in the second subset does not match any data item stored in the Nth buffer, selecting a second number $k_2$ of data items in the second subset of data items stored in the first buffer and storing the second number $k_2$ of data items in a second buffer corresponding to a second compaction level in the compactor hierarchy, the first number $k_1$ being scaled to the second number $k_2$ by a compaction factor F.

\* \* \* \* \*